US012168155B2

(12) United States Patent
Katabi

(10) Patent No.: US 12,168,155 B2
(45) Date of Patent: Dec. 17, 2024

(54) LIQUID STREAM SHAPING DEVICE

(71) Applicant: Ariel Katabi, Pardes Hanna Karkur (IL)

(72) Inventor: Ariel Katabi, Pardes Hanna Karkur (IL)

( * ) Notice: Subject to any disclaimer, the term of this patent is extended or adjusted under 35 U.S.C. 154(b) by 192 days.

(21) Appl. No.: 17/295,060

(22) PCT Filed: Nov. 19, 2019

(86) PCT No.: PCT/IB2019/059925
§ 371 (c)(1),
(2) Date: May 19, 2021

(87) PCT Pub. No.: WO2020/104936
PCT Pub. Date: May 28, 2020

(65) Prior Publication Data
US 2022/0008771 A1 Jan. 13, 2022

Related U.S. Application Data

(60) Provisional application No. 62/769,014, filed on Nov. 19, 2018.

(51) Int. Cl.
*B05B 1/26* (2006.01)
*A62C 2/08* (2006.01)
*A62C 3/02* (2006.01)
*A62C 31/03* (2006.01)
*A62C 31/28* (2006.01)

(52) U.S. Cl.
CPC ................ *A62C 31/03* (2013.01); *A62C 2/08* (2013.01); *A62C 3/0264* (2013.01); *A62C 31/28* (2013.01); *B05B 1/267* (2013.01)

(58) Field of Classification Search
CPC .......... A62C 2/08; A62C 3/0264; B05B 1/267
USPC ............................ 239/222.11, 498, 505, 601
See application file for complete search history.

(56) References Cited

U.S. PATENT DOCUMENTS

| | | | | | |
|---|---|---|---|---|---|
| 1,763,119 | A * | 6/1930 | Archer | B05B 1/267 239/515 |
| 1,933,428 | A * | 10/1933 | Barton | B05B 1/265 239/515 |
| 3,109,593 | A * | 11/1963 | Newland, Sr. | B05B 1/267 239/524 |
| 5,265,802 | A * | 11/1993 | Hobbs | B05B 17/085 239/524 |
| 5,368,228 | A * | 11/1994 | Adamson | B05B 1/267 239/524 |
| 2019/0257678 | A1* | 8/2019 | Posselius | A01C 23/047 |

* cited by examiner

*Primary Examiner* — Jason J Boeckmann
(74) *Attorney, Agent, or Firm* — Rivka Friedman

(57) ABSTRACT

A device for shaping a pressurized liquid stream, the device including: (a) a conduit, adapted for intake and transmission of a liquid stream; (b) a shaping piece configured to shape the liquid stream into a liquid shield, the liquid shield resulting from the liquid stream impacting on the shaping piece. In some embodiments, the device further includes: (c) a lateral displacement mechanism adapted to adjust a distance between the conduit and the shaping piece.

14 Claims, 4 Drawing Sheets

Graph 1

LIQUID STREAM SHAPING DEVICE

FIELD OF THE INVENTION

The present invention relates to a liquid dispersion device and more specifically, to a device for shaping a high pressure stream of liquid.

BACKGROUND OF THE INVENTION

Firefighting personnel may use fire containment devices in order to contain or limit the spread of burning fires. Certain types of fire containment devices shape high pressure water streams to spread the stream in a substantially planar arrangement in order create a pseudo wall of the water. However, such "water walls" are only semi effective against active fires and/or the spread of noxious gases and fluids as they can only limit the spread of the fire in a single direction, and are limited in height and width by the physical limits of the pressure at which the liquid is expelled and the number of devices used.

SUMMARY OF THE INVENTION

According to the present invention there is provided a device for shaping a pressurized liquid stream, the device including: (a) a conduit, adapted for intake and transmission of a liquid stream; (b) a shaping piece configured to shape the liquid stream into a liquid shield, the liquid shield resulting from the liquid stream impacting on the shaping piece; and (c) a lateral displacement mechanism adapted to adjust a distance between the conduit and the shaping piece.

According to further features in preferred embodiments of the invention described below the configuration and dimension of the liquid shield is defined by a shape of the shaping piece, the distance between an outlet opening of the conduit and the shaping piece and a level of pressure under which the liquid stream exits the outlet opening.

According to still further features in the described preferred embodiments the conduit includes: (i) a hose coupling disposed on an intake end of the conduit, the hose coupling adapted for coupling a garden hose or a fire hose to the conduit, (ii) an outlet opening on an outlet end of the conduit; and (iii) a half-cylinder pipe intervening between the hose coupling and the outlet opening, the half-cylinder pipe adapted to increase pressure of a liquid entering the conduit via the hose coupling.

According to further features the lateral displacement mechanism is detachably or non-detachably coupled to the shaping piece. According to further features the lateral displacement mechanism is a manually operated mechanism or a motor-driven mechanism.

According to further features the device further includes: (d) a base adapted to support the conduit, the shaping piece and the lateral displacement mechanism. According to further features the base includes at least two legs that are integrally formed or attached. According to further features the at least two legs are height adjustable. According to further features the base includes four legs.

According to further features the shaping piece is planar, for example flat and semi-circular in shape. According to further features the shaping piece is non-planar. For example, the shaping piece is implemented as a half-cone element. According to further features the shaping piece includes grooves scored along the half-cone element, the grooves extending radially from an apex to a flat base of the half-cone element. The grooves affect a droplet size of the liquid shield.

According to further features the device further includes a laser-based calibration mechanism.

According to another embodiment there is provided a device for shaping a pressurized liquid stream, the device including: (a) a conduit, adapted for intake and transmission of a liquid stream; and (b) a non-planar shaping piece spaced apart from an outlet opening of the conduit, the non-planar shaping piece configured to shape the liquid stream into a three-dimensional liquid shield, the three-dimensional liquid shield resulting from the liquid stream impacting on the non-planar shaping piece.

According to further features the device further includes (c) a lateral displacement mechanism adapted to adjust a distance between the conduit and the non-planar shaping piece.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figures 1A, 1B, 1C, 1D:
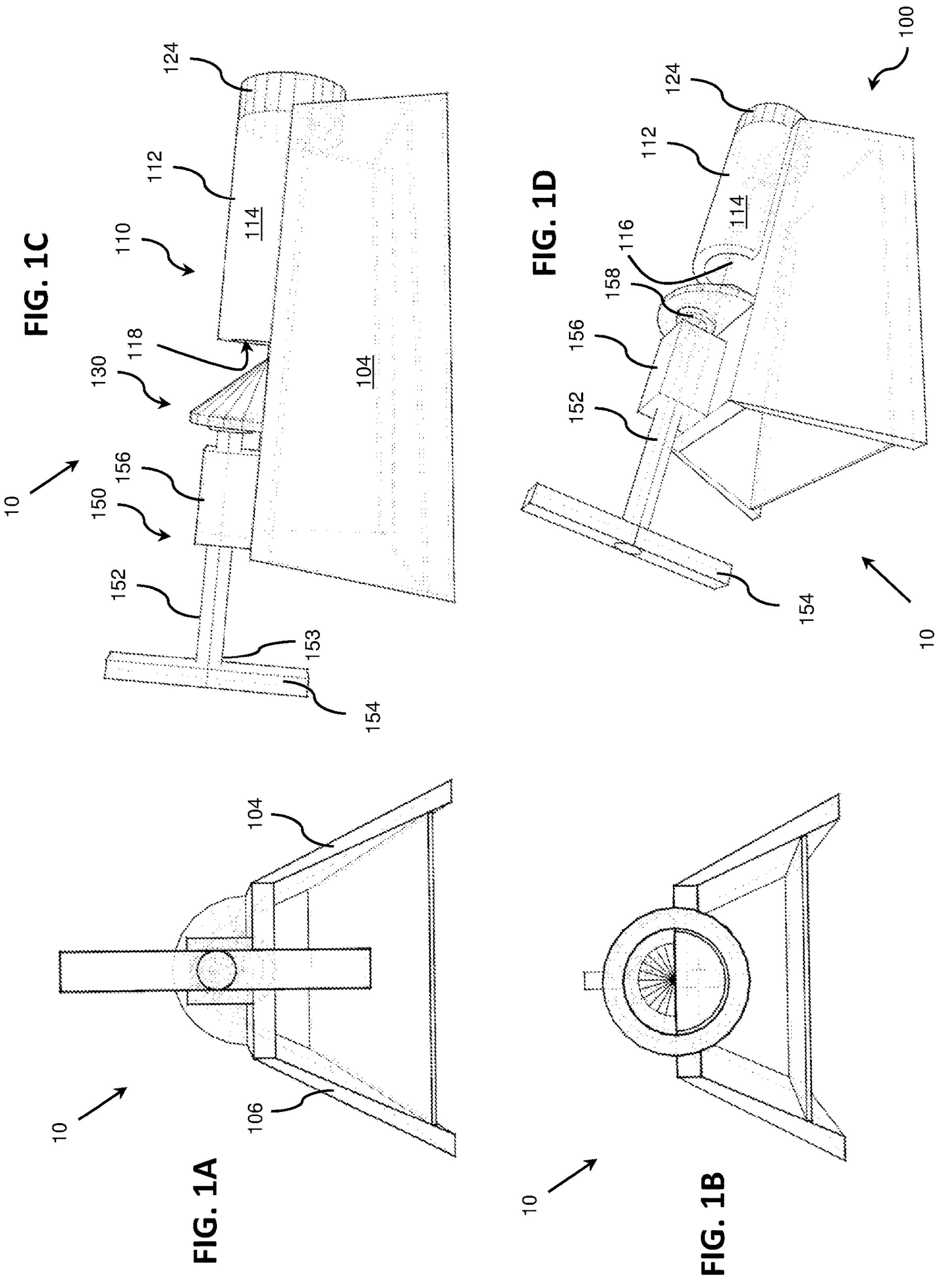
FIGS. 1A-E illustrate schematic representations of a device for shaping a liquid stream.

The principles and operation of the liquid stream shaping device according to the present invention may be better understood with reference to the drawings and the accompanying description.

The device of the present disclosure is applicable to various material containment situations, and is of particular value when applied to the containment of fire and other hazardous materials. The device may be used to advantage to combat the spread of fires by creating a liquid shield of adjustable shape and dimension around the fire. When used to prevent the spread of hazardous materials, for example fuel or other materials leaking from a leak point, the device may be used to prevent the spread of such materials by creating the liquid shield around the leak point. Smoke and noxious gases can also be prevented from spreading with the instant device, by enclosing the gases and preventing wind from spreading the gases from the leak point.

The device of the present disclosure is also applicable in preventative situations, for example cooling and/or protecting vessels containing hazardous or flammable materials, such as domestic gas tanks. In such preventative situations, the device may be deployed to create the liquid shield around the vessel, thereby acting to cool and protect the vessel. Essentially, the device creates a liquid dome-like covering that resembles a hemisphere, providing 360° coverage in the planar surface on which the device is deployed (e.g., the ground), and approximately 180° in the plane normal to the plane of the deployment. The non-planar dispersion of the liquid actively (i.e. even before gravity affects the flight of the droplets) creates a curved shield while gravity (passively) ensures the encasement of the surface area. Therefore, if the device is raised above the surface, gravity ensures that the liquid sides of the dome continue to provide a liquid barrier down to the surface.

The instant device can be used in many different applications, not only firefighting. For example, the liquid coverage can be used in agriculture to irrigate a predefined surface area from a single location (i.e. obviating the need for multiple irrigating sources). Furthermore, the device is portable such that it can be easily moved from place to place as needed. The liquid shield can also be preventative. For example, the liquid shield can prevent frost damage and the like.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. Initially, throughout this document, references are made to directions such as, for example, upper and lower, top and bottom, and the like. These directional references are exemplary only to illustrate the invention and embodiments thereof.

Figure 1E:
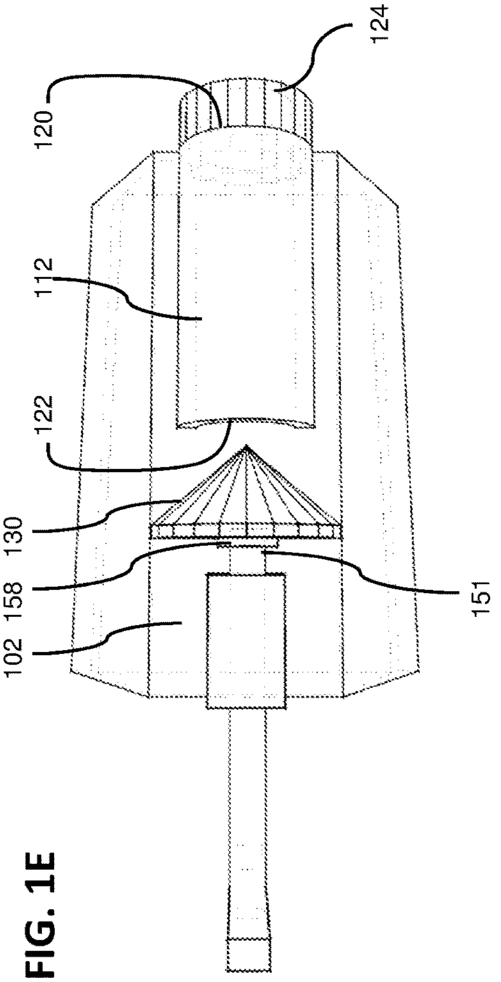

Referring now to the drawings, FIGS. 1A to 1E illustrate schematic representations of a device, generally designated 10, constructed and operative according to an embodiment of the present disclosure, for shaping a liquid stream. For the sake of clarity, the directionality of the views is based on the direction of liquid flow. As such, the front of device 10 is the intake end and the back of the device is the handle end. FIG. 1A is a back view of device 10. FIG. 1B is a front view of the device 10. FIG. 1C is a side view of the device 10. FIG. 1D is an isometric view of device 10. FIG. 1E is a top-down view of the device 10.

In the embodiment of FIGS. 1A-E device 10 can be described as having three functional parts, namely a conduit 110, a shaping piece 130 and a lateral displacement mechanism 150. It is importantly noted that lateral displacement mechanism 150 may be neutralized (or removed) in other embodiments. That is to say that the distance between the conduit and shaping piece, in those embodiments, is set and non-changing. Embodiments where the shaping piece and conduit are set apart at a fixed distance are detailed below.

Referring back to the FIGS. 1A-E and the configuration of the device depicted therein, device 10 is constructed and designed for shaping a pressurized liquid stream. According to all embodiments, the device includes a conduit, adapted for intake and transmission of a liquid stream and a shaping piece configured to shape the liquid stream into a liquid shield, the liquid shield resulting from the liquid stream impacting on the shaping piece. The conduit and shaping piece are arranged on the same plane and spaced apart from one another.

Base

Device 10 includes a base 100 adapted to support the conduit 110, the shaping piece 130 and the lateral displacement mechanism 150. The base structure 100 includes a planar top surface 102 supported by at least two legs. In the depicted embodiment, the planar top surface is supported by two support legs, namely a first support leg 104 and a second support leg 106, on opposite sides of the planar top surface 102. The top surface 102 and the support legs 104, 106 may be integrally formed, or may be connected together via mechanical fasteners, such as screws or the like.

Preferably, the support legs have a height deferential between a front end and a back end, thereby setting the device at an inclined angle. The slanted base angles the output end of the device for improved results of the liquid shield and improved stability of the device 10.

In alternative embodiments, the at least two legs are height adjustable. In embodiments, the at least two legs include four legs. The four legs may or may not be height adjustable.

According to certain embodiments, the base structure 100 is constructed from aluminum or stainless steel. Note however, that the base structure 100 may be alternatively constructed from any rigid and water damage resistant material that is capable of supporting the weight of the intake piping arrangement 112 and the lateral displacement mechanism 150, may be utilized. In embodiments, a compartment 108 beneath the top surface of the base can be used for storage of the shaping pieces and/or a calibration device.

Conduit

The device includes conduit 110 which is constructed and adapted for the intake and conduction/transmission of a liquid stream from a source such as a fire truck or hydrant (via a fire hose), a domestic water source (e.g. via a garden hose) or an industrial fire suppression system. The conduit is further adapted for pressure conversion (increasing pressure) of the liquid stream. However, the exact shape of the conduit, and hence level of pressure conversion can change from embodiment to embodiment. In some embodiments, there is no pressure conversion or negative pressure conversion (i.e. going from a higher pressure to a lower pressure).

Conduit 110 has a liquid intake arrangement and also includes a pressure conversion element. Conduit 110 includes a hollow pipe 112 formed from a half cylinder-shaped upper sidewall 114 and a generally planar lower sidewall 116. The bottom side of the lower sidewall 116 is attached to the top surface 102 of a base structure 100. In some embodiments, there is no separate lower sidewall 116 and upper sidewall 114 is attached directly to top surface of base 100, such that the section of top surface 102 directly underneath upper wall 116 is the lower wall. The sidewalls 114, 116 provide the pipe 112 with a hollow half cylinder-shaped interior space 118 (i.e., volume) which acts to further pressurize liquid (i.e., water) that flows through the pipe 112. This is the pressure conversion element of the conduit. The sidewalls 114, 116 may be integrally formed, or may be connected together via mechanical fasteners, such as screws or the like. Alternatively, the pipe may have any shape (i.e.

cross-section) other than the half cylindrical shape, e.g. a square or triangular etc. cross-section.

The pipe 112 has a liquid intake opening 120 at a first/intake end, and a liquid outlet opening 122 at a second/outlet end. The length of the pipe 112 (defined as the distance between the intake opening/inlet port 120 and the outlet opening/outlet port 122).

The inlet opening 120 includes a connector or adapter (hereafter 'hose coupling') 124 configured to receive an external liquid conduit (e.g. a fire or garden hose or some other pipe etc.) for supplying liquid to the intake piping arrangement/conduit 110. In certain embodiments, the connector/adapter is configured to connect to the output end of a fire hose in order to receive high pressure spray from a water source, such as, for example, a fire hydrant or fire truck. In other embodiments, the connector/adapter 124 is configured to connect to the output end of a garden hose connector. According to certain embodiments, the intake piping arrangement 110 is constructed from aluminum or stainless steel or any other water damage resistant material.

For example, in the event of a fire, a fire fighter (or home owner) connects a hose to device 10 by connecting or affixing the water pipe to the hose coupling 124 that is disposed on the intake end 120 of the conduit 110. Hose coupling 124 is adapted for coupling a garden hose or a fire hose to the conduit. Any coupling arrangement known in the art is considered within the scope of the invention. Examples of coupling arrangements used in firefighting include, but are not limited to: a Storz coupling, Swedish SMS 32 or 63, Finnish SFS couplers, Russian ROTTA 3-lugs and so on.

The half-cylinder pipe 112 intervenes between the hose coupling 124 and an outlet opening 122 on the outlet end of the conduit. The half-cylinder pipe 112 is adapted to increase pressure exerted on the liquid by between 50% and 100%. This conversion takes place when the liquid transitions from the hose to the pipe and the size of circumference of the conduit through which the liquid is travelling is cut in half (depending on the configurations of the hose, and the half cylinder pipe and the length of the pipe).

It is understood that the configuration and length of the conduit, and hence the resulting volume 118 of the conduit, are determined at the time of manufacture according to a desired/preselected pressure within the conduit. The pressure inside the conduit has a direct and predictable correlation to the liter per minute ratios which, in turn, are selectably determined (within given parameters) by adjusting the distance between the conduit and the shaping piece. It is understood that the conduit may not include a pressure convention aspect, and any shape of the conduit is considered to be within the scope of the invention.

Shaping Piece

The device further includes a shaping piece 130 that is configured to shape the liquid stream exiting the conduit into a liquid shield. The liquid shield is a shaped curtain of liquid that is dispersed in a selected pattern. The liquid shield is effected or comes about as a result of the liquid stream being forced through the conduit, impacting on the shaping piece and being deflected or dispersed in a predictable and desired pattern.

The shape (pattern/configuration) and dimension (height, width, droplet size) of the liquid shield is adjustable by manipulating the distance between the conduit and the shaping piece and/or selecting a shaping piece of a given shape to get the desired pattern of liquid shield and/or a level of pressure under which the liquid stream exits the outlet opening and impacts on the shaping piece.

Figure 2A:
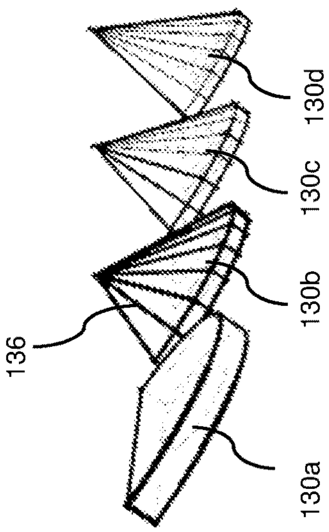
FIGS. 2A-E are various views of shaping pieces.
Figure 2B:
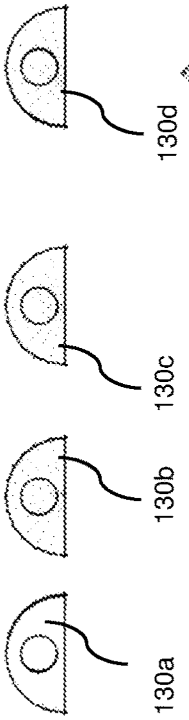
Figure 2C:
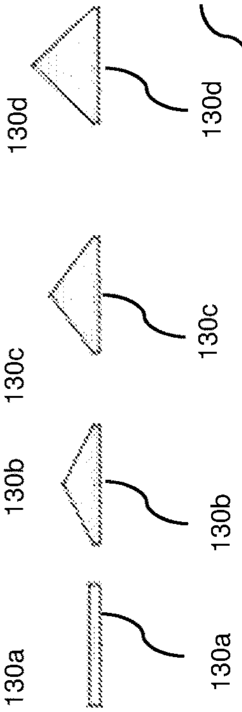
Figure 2D:
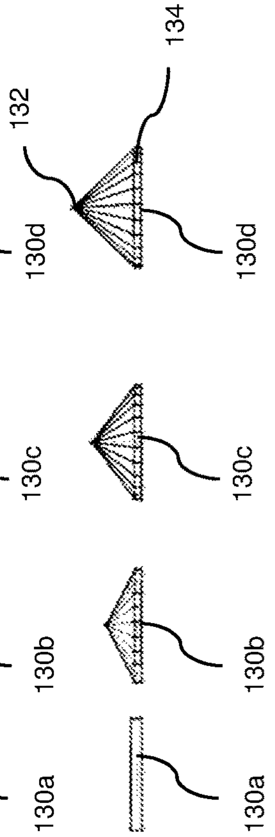
Figure 2E:
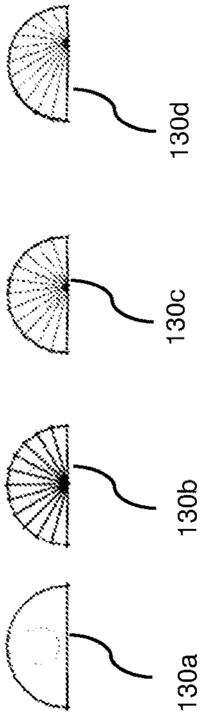

The shaping piece 130 may be implemented in various ways. Once again following the direction of liquid flow in order to determine sides of the shaping pieces, the side of the shaping piece receiving the liquid stream is the front side. FIGS. 2A to 2E are various views of shaping pieces 130*a*, 130*b*, 130*c* and 130*d*. FIG. 2A is an isometric side view of shaping pieces 130*a-d*. FIG. 2B is a back view of pieces 130*a-d*. FIG. 2C is a bottom view of 130*a-d*. FIG. 2D is a top view of 130*a-d*. FIG. 2E is a front view of 130*a-d*.

In one non-limiting implementation, the shaping piece 130 is implemented as a planar, semi-circular element 130*a* having a diameter that approximately equal to the external diameter of the pipe 112 but may have a greater or smaller diameter. The planar shaping piece may be positioned vertically (i.e. normal to the horizontal plane or perpendicular to the direction of the liquid stream exiting the conduit) or at any angle off the vertical (i.e. leaning away from the conduit or leaning towards the conduit).

In another non-limiting implementation, the shaping piece 130 is implemented as a non-planar element. For example, there is disclosed a half cone-shaped element 130*b* or 130*c* or 130*d*. In such implementations, the base/back of the half cone is attached to the connector 158, and the point or apex of the half cone faces the liquid outlet opening 122. The bottom, flat portion of the half cone rests on the planar top surface 102 and may slide along the top surface 102.

The shaping pieces 130 can be interchangeably replaced depending on the desired shape and dimension of the liquid shield as well as the droplet size of the droplets that make up the liquid shield.

The liquid shield resulting from the liquid stream impacting on the planar shaping piece is a substantially planar liquid dispersion pattern before gravity influences the droplets. In some cases, such as when the planar shaping piece is not proportionately larger than the outlet opening of the conduit and/or sufficiently spaced apart from the opening, not all the liquid exiting the outlet opening is immediately deflected. As a result some liquid travels over the edges of the shaping piece and disrupts the planar pattern of dispersion. The outcome is a dome shaped dispersion pattern of the liquid shield.

The dispersion pattern of the liquid stream impacting on the non-planar shaping piece is a liquid shield with a non-planar dispersion pattern. The non-planar shaping piece is configured to shape the liquid stream into a three-dimensional liquid shield as a result of the liquid stream impacting on the non-planar shaping piece. A three-dimensional liquid shield (or non-planar liquid shield), is a dispersion pattern of liquid droplets that, even without the effects of gravity, is curved as opposed to being straight. The same idea is said in another way above, namely that the dispersal pattern of the liquid encompassing more that an XY plane, even without accounting for gravity.

Figure 4A:
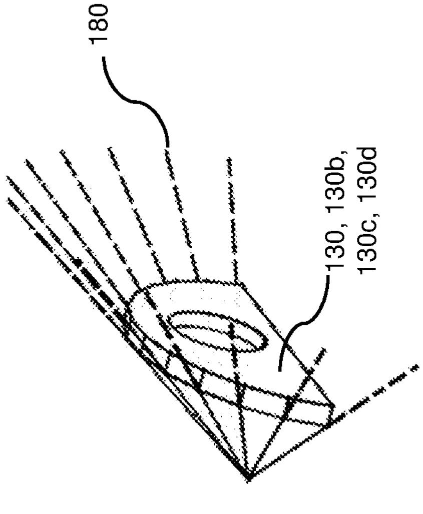
FIGS. 4A and 4B are views of a liquid stream impacting on a non-planar shaping piece and a partial dispersion pattern 180 resulting from the impact.
Figure 4B:
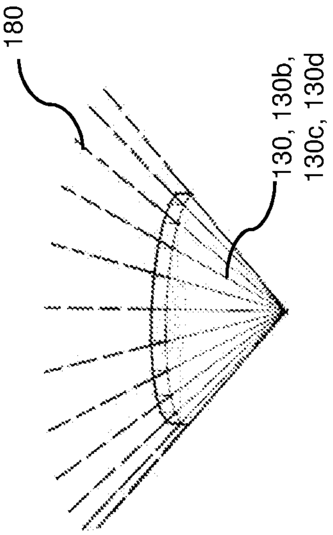
Figure 5A:
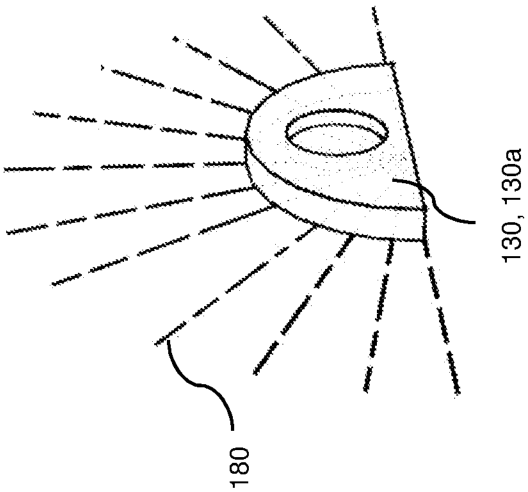
FIGS. 5A and 5B are views of a liquid stream impacting on a planar shaping piece and a partial dispersion pattern resulting from the impact.
Figure 5B:
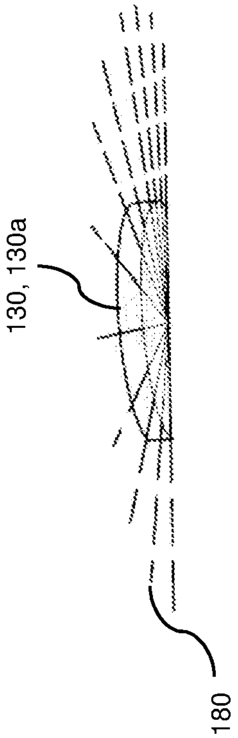

FIGS. 4A and 4B are views of a liquid stream impacting on a non-planar shaping piece 130 (e.g. cone shaped elements 130*b*, 130*c* and 130*d*) and a partial dispersion pattern 180 resulting from the impact. FIGS. 5A and 5B are views of a liquid stream impacting on a planar shaping piece 130 (e.g. flat, semi-circular element 130*a*) and a partial dispersion pattern 180 resulting from the impact.

Lateral Displacement Mechanism

The device further includes the lateral displacement mechanism 150, the function of which is to adjust a distance between the conduit 110 and the shaping piece 130. In embodiments, such as the embodiment disclosed herein, the shaping device is coupled to the lateral displacement mechanism and the distance between the conduit and shaping piece is adjusted by moving the shaping piece closer to, or further away from the conduit (which is stationary relative to the base 100 to which it is fixed).

In alternative embodiments, the displacement mechanism moves the conduit while the shaping piece is stationary (i.e. fixed to the base). A variation of this alternative is that the conduit has an adjustable length, e.g. telescopically extending towards the shaping piece or retracting away from the shaping piece. In yet other alternative embodiments, both of the components 110, 130 are moved by the lateral displacement mechanism relative to a fixed base or both of the components are fixed relative to respective bases and the displacement mechanism controls the distance between the fixed components. Any variations, modifications and compositions of the aforementioned configurations and attributes can be applied mutatis mutandis to any of the alternatives disclosed heretofore.

In the exemplary configuration in which the innovative device is embodied herein, and depicted in the Figures, the lateral displacement mechanism 150 is operationally coupled to the shaping piece 130. In embodiments, the mechanism 150 is detachably coupled to the shaping piece, e.g. by a magnet, such as a neodymium magnet or samarium-cobalt magnet. Any other detachable coupling arrangement is considered within the scope of the invention. In an alternative embodiment, the lateral displacement mechanism is non-detachably coupled to the shaping piece, e.g. via welding.

In an exemplary embodiment lateral displacement mechanism 150 includes a rod 152, a handle 154, a fastening arrangement 156 and a connector element 158. The mechanical fastening arrangement 156 is attached to the top surface 102 of the base structure 100 via screws, welding or the like. Any actuation arrangement that controls the lateral (substantially horizontal) movement of the lateral displacement mechanism is included within the scope of the invention.

In embodiments, the rod 152 includes an external threading (not shown) that is correspondingly configured to engage with the internal threading of mechanical fastening arrangement 156. As such, rotation of the rod 152 initiates displacement of the rod 152 along the length of the planar top surface 102, such that the rotation moves a first end 151 of the rod 152 closer to, or further away from, the liquid outlet port 122. The handle 154 is connected to the rod 152 at a second end 153 (opposite the first end 151). The handle 154 and the rod 152 may be integrally formed, or may be connected together via mechanical fasteners, such as screws, a threaded coupling arrangement or the like. According to certain embodiments, the components of the lateral displacement mechanism 150 are constructed from stainless steel.

In some embodiments the lateral displacement mechanism 150 is a manually operated mechanism. For example, the rod 152 is manually displaced by rotating handle 154. Exemplarily, rotating the handle in a clockwise direction moves the first end of the rod closer to the outlet opening of the conduit and rotating the handle counter-clockwise moves the first end 151 further away from the opening.

In other embodiments the lateral displacement mechanism is a motor-driven mechanism. For example, a motor is housed in mechanical fastening arrangement 156 and adapted to laterally displace rod 152. For example, the lateral displacement mechanism may be ball screw linear actuator with a servo motor. Controls for the motorized linear actuator may be embedded in the casing of the housing or may be realized on a remote device that is in wired or wireless communication with the motor.

The connector element 158 is attached to the first end 151 of the rod 152. In certain embodiments, the connector is a magnetized element, which in a non-limiting implementation is implemented as a neodymium magnet. The connector element 158 may be generally circular in shape and have a central aperture arranged to receive the first end 151 of the rod 152. When inserted into the central aperture, the rod 152 (via the first end 151) may be fixedly attached to the connector element 158 via adhesive materials.

The connector element 158 is operative to engage with the stream shaping element/shaping piece 130, so as to allow joint displacement of the shaping piece 130 and the connector element 158. In implementations in which the connector element 158 is implemented as a magnet, the engagement between the connector element 158 and the stream shaping element/piece 130 is made via magnetic force.

In certain embodiments, the shaping piece 130 is attached directly to the first end 151 of the rod 152 without using the connector element 158. In such embodiments, the first end 151 includes an external threading and the shaping piece 130 includes a central threaded aperture that is correspondingly configured to receive the external threading of the first end 151. Any other coupling arrangement between the rod and the shaping piece is considered within the scope of the invention.

The shaping piece 130 is deployed (i.e., attached to the lateral displacement mechanism 150 via the connector element 158) such that the bottom surface of the shaping piece 130 slides along the top surface 102 of the base structure 100. In operation, the shaping piece 130 is displaced along the length of the planar top surface 102 in order to change the distance between the shaping piece 130 and the outlet opening 122. The shaping piece 130 is displaced together with the connector element 158, which as discussed above, is initiated by the rotation of the handle 154 or activation of the motorized linear actuator. In certain embodiments, the shaping piece 130 is constructed from stainless steel.

Figure 3:
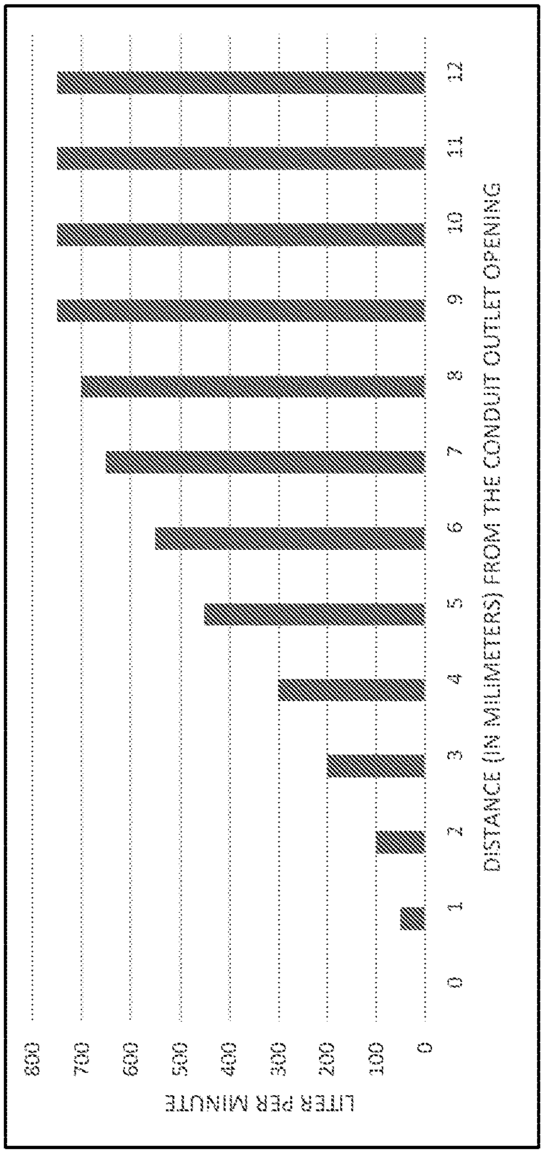
FIG. 3 is a graph (Graph 1) detailing the distance to liter per minute ratio.

FIG. 3 depicts a graph (Graph 1) detailing the distance to liter per minute ratio. It is made clear the range of pressure inside the conduit is limited only by the laws of physics. The pressure differential can be anywhere between 0 and 10000 atmospheres. A preferred pressure range inside the conduit is between 1 and 100 atmospheres. A preferred pressure inside the conduit is between 2.5 and 7.5 atmospheres, depending on the size, shape and length of the pipe. In the instantly disclosed embodiment, the pressure inside the conduit is approximately 5 atmospheres, which is a most preferred embodiment. Graph 1 enumerates the distant to liter per minute ratio based on approximately 5 atmospheres inside the conduit.

Liquid Shield

When the shaping piece 130 is implemented as a semi-circular element 130*a*, and is positioned proximate to the outlet opening 122, the liquid shield takes the general shape of a wall. The resulting wall, based on parameters provided above, is approximately eight meters high and 20 meters wide. As the shaping piece 130 is moved farther away from the outlet opening 122, the liquid shield forms a dome-like shape on the surface on which the device 10 is deployed (e.g. the ground). The dome-like shape resembles a hemisphere, providing 360° coverage in the planar surface on which the device 10 is deployed (e.g., the ground), and approximately 180° in the plane normal to the plane of the deployment.

In alternative implementations, such as when the shaping piece 130 is implemented as a half cone-shaped element 130*b*, 130*c*, 130*d* and the like, that is moved farther away from the outlet opening 122, the liquid shield takes the shape of a capsule. In embodiments, the shaping piece further includes grooves 136 scored along the sloping body of the half-cone element. The grooves extend radially from an apex 132 to a flat base 134 of the half-cone element 130*b*, 130*c*, 130*d*.

Generally speaking, the shape and dimensions (e.g., size) of the liquid shield can be adjusted based on three variable parameters. The first parameter is the implementation of the shaping piece 130 (i.e., implemented as a semi-circle, implemented as a half-cone, etc.). The second parameter is the distance between the shaping piece 130 and the outlet opening 122. The distance between the conduit and the shaping piece is variable, according to some embodiments and is non-variable according to other embodiments (i.e. the distance is predefined and non-adjustable).

As discussed above, in preferred embodiments, the distance between the shaping piece 130 and the outlet opening 122 is adjustable based on rotational movement of the handle 154 (or the motorized linear actuator) or some other lateral actuation arrangement or mechanism. The third parameter is the pressure of the water stream that impinges on the shaping piece 130 (referred to as the output pressure). The output pressure may be a function of the pressure provided by the intake conduit (e.g., fire hose) as well as the internal diameter of the pipe 112.

By adjusting the aforementioned three parameters, the size and shape of the liquid shield may be adjusted. For example, the radius and the height of the liquid shield may be adjusted (either simultaneously or individually) by adjusting one or more of the three parameters.

According to another configuration, briefly mentioned above, there is no lateral adjustment mechanism and the distance between the conduit and the shaping piece is fixed. Aside from the aforementioned, all the components, variations and arrangements discussed above with reference to device 10 are incorporated herein by reference as if fully set forth here again, mutatis mutandis.

In embodiments, according to the instant configuration, the shaping piece is also fixed (non detachable). In other embodiments, the shaping piece is detachable and can be replaced with a different shaping piece having a different configuration.

In embodiments, the shaping piece is planar. The planar shaping piece may be positioned vertically (i.e. normal to the horizontal plane) or at any angle off the vertical. For example, the planar shaping piece 130*a* discussed above can be used here as well.

In other embodiments, the device includes a non-planar shaping piece spaced apart from an outlet opening of the conduit. Examples of non-planar shaping pieces include shaping pieces 130*b*, 130*c* and 130*d* which are half cone elements of different dimensions. The non-planar shaping piece is configured to shape the liquid stream into a three-dimensional liquid shield as a result of the liquid stream impacting on the non-planar shaping piece. A three-dimensional liquid shield (or non-planar liquid shield), is a dispersion pattern of liquid droplets that, even without the effects of gravity, is curved as opposed to being a straight sheet of liquid. The same idea is said in another way above, namely that the dispersal pattern of the liquid encompasses more that an XY plane, even without accounting for gravity.

Some embodiments the device further includes a lateral displacement mechanism adapted to adjust a distance between the conduit and the non-planar shaping piece, as discussed above.

Note that although the components of the device 10 have been described in certain embodiments as being constructed from aluminum and/or stainless steel, such constructions are merely presented for example purposes only, and other embodiments are possible in which some or all of the components of the device 10 are constructed from other suitable water damage resistant materials.

One fundamental distinction between a liquid wall and a shape/pattern of the liquid which is dispersed through the instant device is that a liquid wall is a barrier on a single plane, generally perpendicular to the ground (but may also be at another angle). Fire, smoke or other gases that travel higher or wider than the edges of the fire wall cannot be contained by such a liquid wall. By contrast, the instant device is configured to shape the stream in any one of the desired planar and non-planar configurations that result from adjusting the device or using different shaping pieces.

In embodiments, a laser-based calibration mechanism is used to calibrate the device. For example, three lasers are adjusted to delineate a left-hand boundary, a right-hand boundary and a height boundary. The mechanism then calculates the necessary distance between the shaping piece and the outlet opening as well as the type of shaping piece to be used. Based on the calibration, the device is manually or automatically set according to the settings calculated by the laser-based calibration mechanism. The calibration mechanism may be a standalone device or may be affixed, mounted on or integrated in the device 10. Alternatively, a gradation key (or any type of equivalence table) may be engraved on the top surface of the device (or provided in some other form and/or location) as an indicator for the spread of the shield relative to the type of shaping piece and distance between the conduit outlet and the shaping piece.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A fire-containment device for shaping a pressurized liquid stream, the device comprising:

(a) a conduit, adapted for intake and transmission of a liquid stream, wherein said conduit includes:

(i) a hose coupling disposed on an intake end of said conduit, said hose coupling adapted for coupling a garden hose or a fire hose to said conduit, (ii) an outlet opening on an outlet end of said conduit; and (iii) a half-cylinder pipe defined by a half cylinder-shaped upper sidewall and a planar lower sidewall between said hose coupling and said outlet opening, said half-cylinder pipe having a half-cylinder cross-section and adapted to increase pressure of a liquid entering said conduit via said hose coupling;

(b) a non-planar shaping piece configured to shape said liquid stream into a liquid shield, said liquid shield resulting from said liquid stream impacting on said non-planar shaping piece, wherein said shaping piece is implemented as a half-cone element, the half-cone element having a base on one end and an apex on an opposite end, a curved upper surface and a flat lower surface, the flat lower surface being triangular in shape, the half-cone element being positioned such that the flat surface is on a common plane with the lower sidewall of the half-cylinder pipe and the apex of the half-cone element faces the outlet opening; and (c) a lateral displacement mechanism adapted to adjust a distance between said conduit and said shaping piece.

2. The device of claim 1, wherein a configuration and dimension of said liquid shield is defined by a shape of said shaping piece, said distance between an outlet opening of said conduit and said shaping piece and a level of pressure under which said liquid stream exits said outlet opening.

3. The device of claim 1, wherein said lateral displacement mechanism is detachably coupled to said shaping piece.

4. The device of claim 1, wherein said lateral displacement mechanism is non-detachably coupled to said shaping piece.

5. The device of claim 1, wherein said lateral displacement mechanism is a manually operated mechanism.

6. The device of claim 1, further comprising:

(d) a base adapted to support said conduit, said shaping piece and said lateral displacement mechanism.

7. The device of claim 6, wherein said base includes at least two legs.

8. The device of claim 7, wherein said at least two legs are integrally formed with said base.

9. The device of claim 7, wherein said at least two legs are height adjustable.

10. The device of claim 7, wherein said at least legs include four legs.

11. The device of claim 1, wherein said shaping piece includes grooves scored along said half-cone element, said grooves extending radially from the apex to the flat base of said half-cone element.

12. The device of claim 11, wherein said grooves affect a droplet size of said liquid shield.

13. A fire-containment device for shaping a pressurized liquid stream, the device comprising:

(a) a conduit, adapted for intake and transmission of a liquid stream, wherein said conduit includes:

(i) a hose coupling disposed on an intake end of said conduit, said hose coupling adapted for coupling a garden hose or a fire hose to said conduit, (ii) an outlet opening on an outlet end of said conduit; and (iii) a half-cylinder pipe defined by a half cylinder-shaped upper sidewall and a planar lower sidewall between said hose coupling and said outlet opening, said half-cylinder pipe having a half-cylinder cross-section and adapted to increase pressure of a liquid entering said conduit via said hose coupling; and (b) a non-planar shaping piece spaced apart from an outlet opening of said conduit, said non-planar shaping piece configured to shape said liquid stream into a liquid shield resulting from said liquid stream impacting on said non-planar shaping piece, wherein said shaping piece is implemented as a half-cone element, the half-cone element having a base on one end and an apex on an opposite end, a curved upper surface and a flat lower surface, the flat lower surface being triangular in shape, the half-cone element being positioned such that the flat lower surface is on a common plane with the lower sidewall of the half-cylinder pipe and the apex of the half-cone element faces the outlet opening.

14. The device of claim 13, further comprising:

(c) a lateral displacement mechanism adapted to adjust a distance between said conduit and said non-planar shaping piece.

* * * * *